(12) United States Patent
Raffaelli

(10) Patent No.: US 11,046,363 B2
(45) Date of Patent: Jun. 29, 2021

(54) FRONT FORK OF A MOTOR VEHICLE

(71) Applicant: PIAGGIO & C. S.P.A., Pontedera (IT)

(72) Inventor: Andrea Raffaelli, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 311 days.

(21) Appl. No.: 15/774,793

(22) PCT Filed: Dec. 27, 2016

(86) PCT No.: PCT/IB2016/058017
§ 371 (c)(1),
(2) Date: May 9, 2018

(87) PCT Pub. No.: WO2017/115273
PCT Pub. Date: Jul. 6, 2017

(65) Prior Publication Data
US 2020/0010116 A1 Jan. 9, 2020

(30) Foreign Application Priority Data
Dec. 28, 2015 (IT) .......................... 102015000088081

(51) Int. Cl.
*B62D 9/02* (2006.01)
*B62K 5/01* (2013.01)
(Continued)

(52) U.S. Cl.
CPC ................. *B62D 9/02* (2013.01); *B62K 5/01* (2013.01); *B62K 5/027* (2013.01); *B62K 5/08* (2013.01);
(Continued)

(58) Field of Classification Search
CPC .......... B62K 5/027; B62K 5/08; B62K 21/02; B62K 25/06; B62K 25/14; B62K 25/22; B62K 5/10; B62K 2005/001
See application file for complete search history.

(56) References Cited

U.S. PATENT DOCUMENTS 5,238,259 A * 8/1993 Wilson ................... B62K 21/02
280/276
5,417,446 A * 5/1995 Pileggi ................... B62K 21/02
188/282.5

(Continued)

FOREIGN PATENT DOCUMENTS

CH          706111 A2    8/2013
CN         2354858 Y    12/1999
(Continued)

OTHER PUBLICATIONS

International Search Report and Written Opinion for PCT/IB2016/058017 dated Jun. 2, 2017.
(Continued)

*Primary Examiner* — Minnah L Seoh
*Assistant Examiner* — Conan D Duda
(74) *Attorney, Agent, or Firm* — Cantor Colburn LLP

(57) ABSTRACT

A front fork (4) of a motor vehicle, comprising a first lining (24), a first stem (28) and a second lining (48), wherein the first stem (28) slides axially inside the first lining (24) along a first sliding axis, the first stem (28) and the first lining (24) are associated one to one hub (32) for rotatably housing the rotation pin of an axle journal of a wheel and the other to a steering column (40) by means of a bracket (44), or vice versa, the second lining (48) is integral in rotation with the first lining (24), is arranged so that, with respect to a projection plane perpendicular to the first sliding axis, the projection area of the first lining (24) is eccentrically contained in the projection area of the second lining (48), and is integrally attached to said hub (32) or to said steering column (40).

26 Claims, 16 Drawing Sheets

(51) Int. Cl.
    *B62K 5/027*     (2013.01)
    *B62K 5/08*     (2006.01)
    *B62K 5/10*     (2013.01)
    *B62K 25/00*     (2006.01)
    *B62K 25/08*     (2006.01)
    *B62K 5/00*     (2013.01)

(52) U.S. Cl.
    CPC .............. *B62K 5/10* (2013.01); *B62K 25/005* (2013.01); *B62K 25/08* (2013.01); *B62K 2005/001* (2013.01)

(56) References Cited

U.S. PATENT DOCUMENTS

| | | | | |
|---|---|---|---|---|
| RE35,401 E | * | 12/1996 | Wilson | B62K 21/02 280/276 |
| 6,533,305 B1 | | 3/2003 | Falk | |
| 2003/0001358 A1 | * | 1/2003 | Becker | B62K 25/06 280/276 |
| 2005/0023794 A1 | * | 2/2005 | Czysz | B62K 21/02 280/276 |
| 2005/0127636 A1 | * | 6/2005 | Czysz | B62K 25/02 280/276 |
| 2008/0164674 A1 | * | 7/2008 | Chen | B62J 11/00 280/280 |
| 2010/0133776 A1 | * | 6/2010 | Galasso | B62K 21/02 280/276 |
| 2012/0032411 A1 | * | 2/2012 | Kuwabara | B62K 5/01 280/124.155 |
| 2012/0240732 A1 | * | 9/2012 | Scott | B25B 13/48 81/124.6 |
| 2012/0305350 A1 | * | 12/2012 | Ericksen | F16F 9/46 188/269 |
| 2013/0026730 A1 | * | 1/2013 | Galasso | B62K 25/08 280/276 |
| 2014/0145413 A1 | * | 5/2014 | Baltaxe | B62K 21/02 280/279 |
| 2014/0175764 A1 | * | 6/2014 | Murakami | B60G 17/015 280/5.514 |
| 2015/0259027 A1 | * | 9/2015 | Takano | B62K 25/08 280/267 |
| 2016/0229482 A1 | * | 8/2016 | Bock | B62K 25/08 |
| 2016/0288866 A1 | * | 10/2016 | Toda | F16F 9/0218 |
| 2016/0311498 A1 | * | 10/2016 | Bossard | B62K 25/06 |
| 2016/0332691 A1 | * | 11/2016 | Becker | B62K 19/38 |
| 2016/0339990 A1 | * | 11/2016 | Walthert | B62K 25/08 |
| 2018/0187735 A1 | * | 7/2018 | Witting | B62K 25/06 |

FOREIGN PATENT DOCUMENTS

| | | |
|---|---|---|
| CN | 101746467 A | 6/2010 |
| CN | 103874626 A | 6/2014 |
| CN | 104487330 A | 1/2015 |
| CN | 104487321 A | 4/2015 |
| EP | 2913257 A1 | 9/2015 |
| WO | 2012007819 A1 | 1/2012 |

OTHER PUBLICATIONS

Taiwanese Office Action for corresponding application 105143310; dated Apr. 24, 2020.

\* cited by examiner

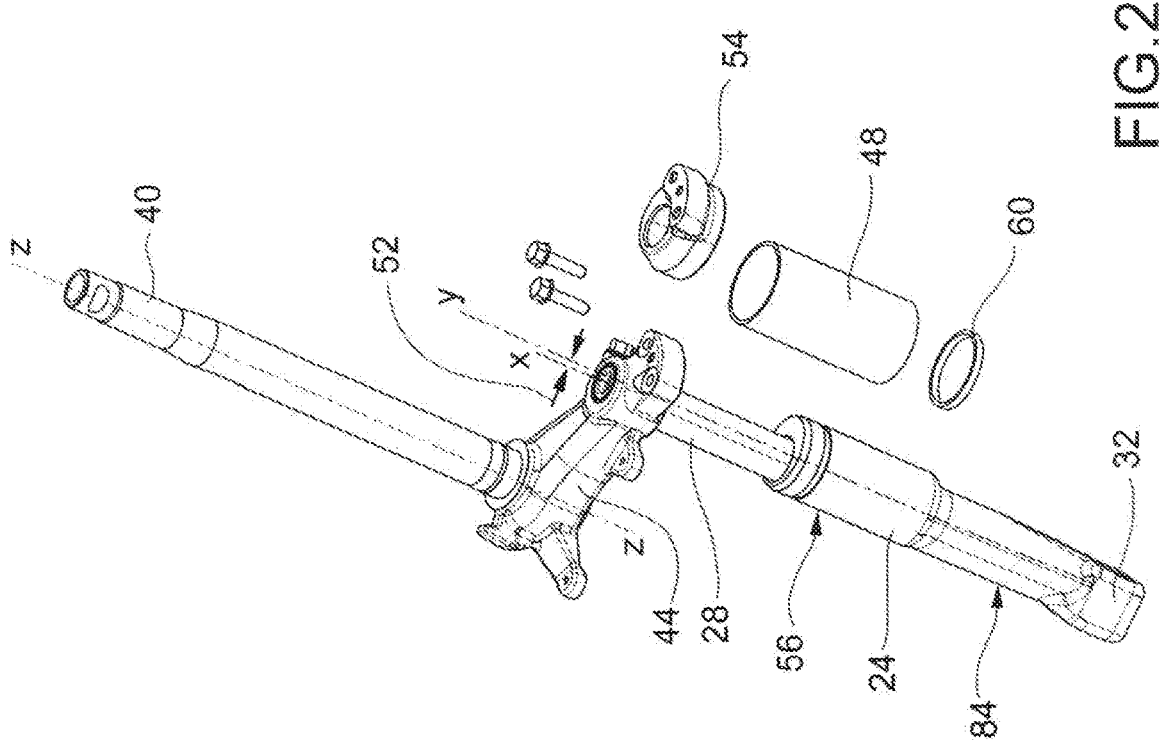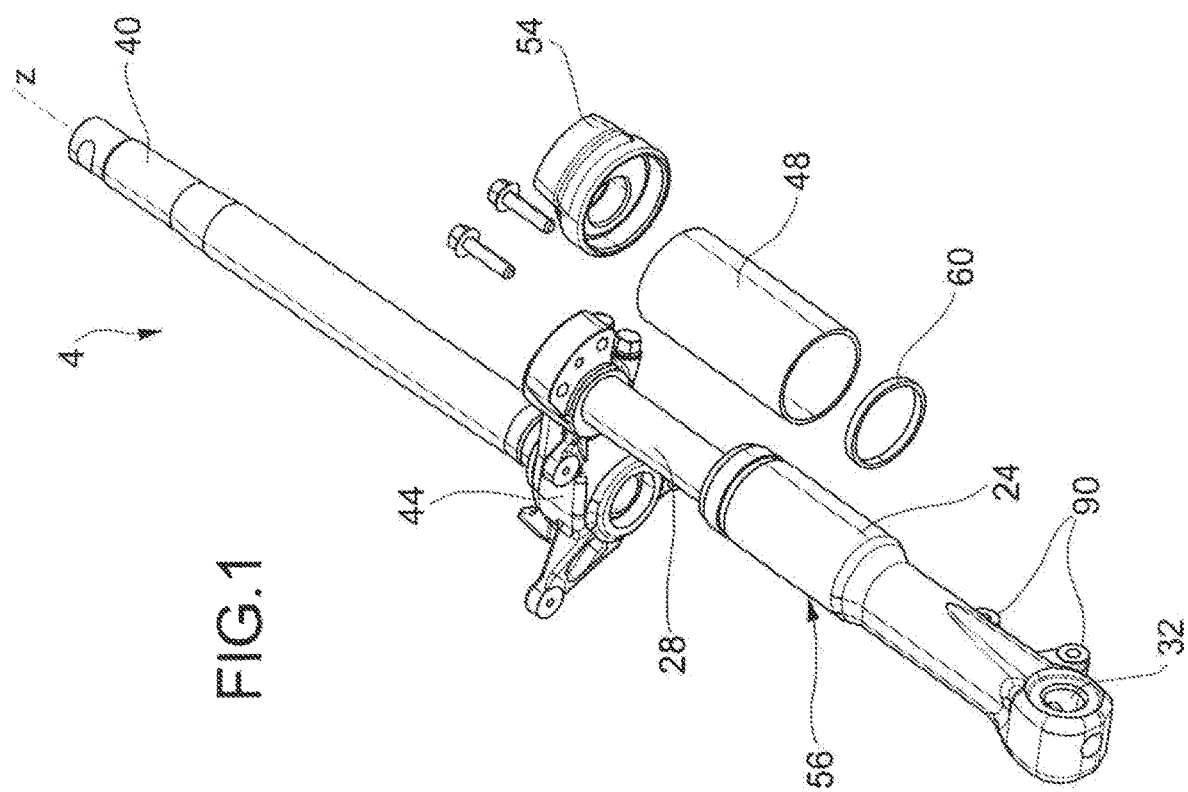

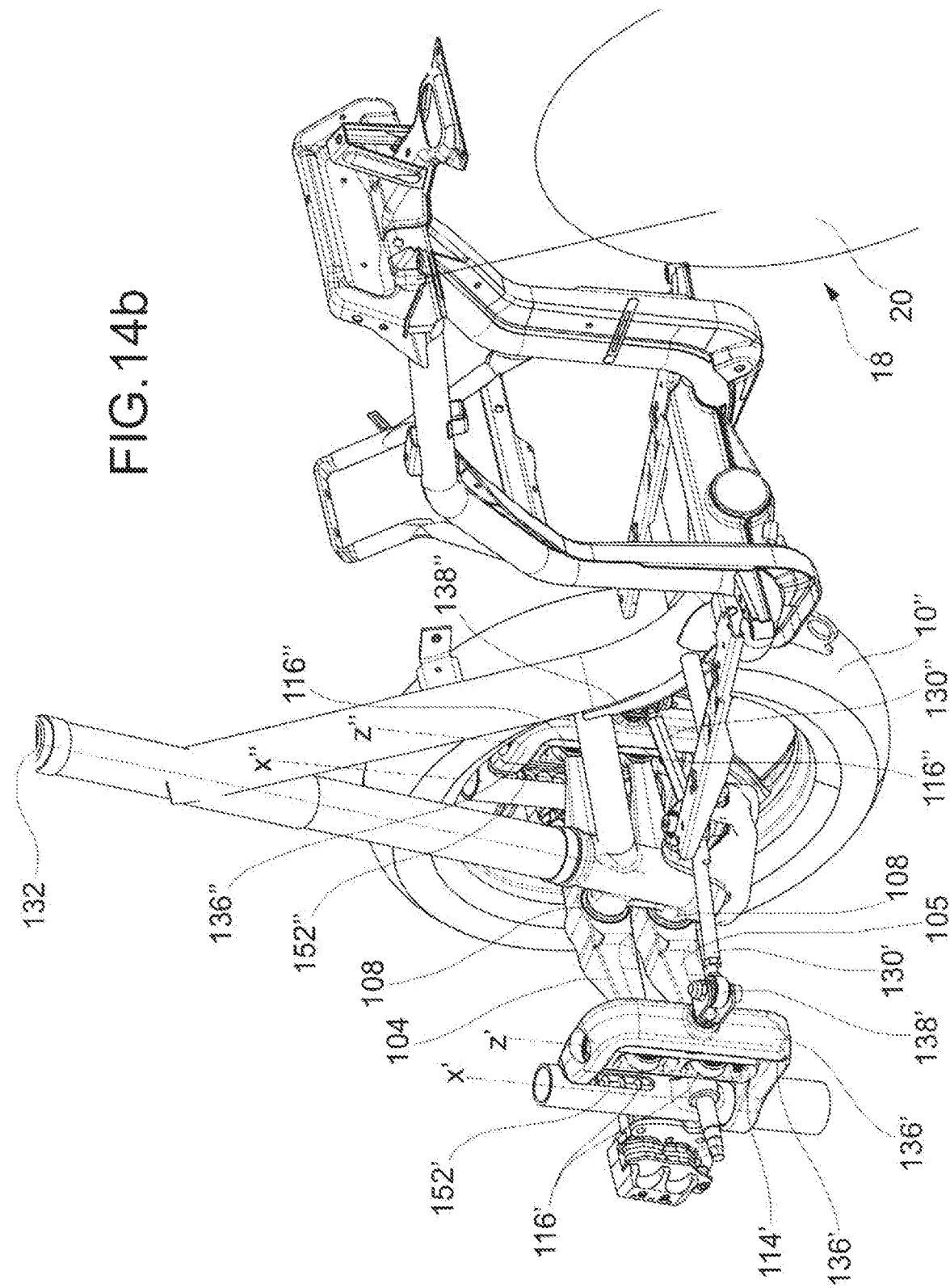

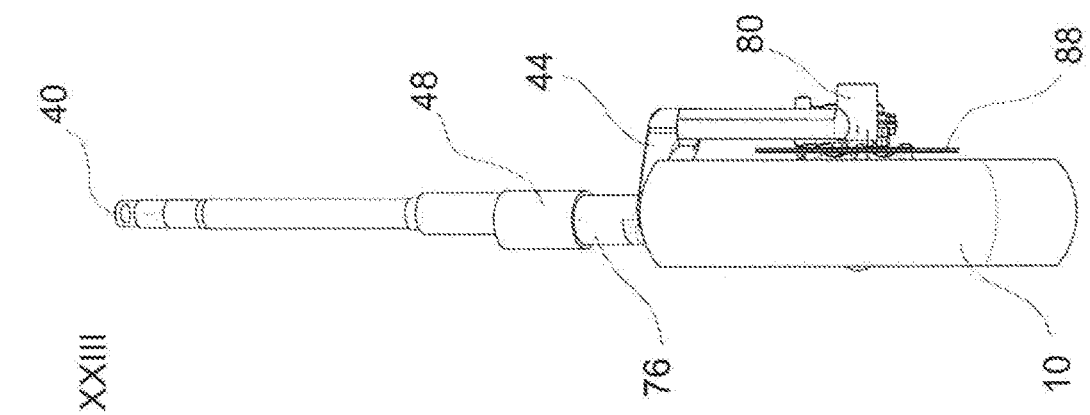
FIG. 25
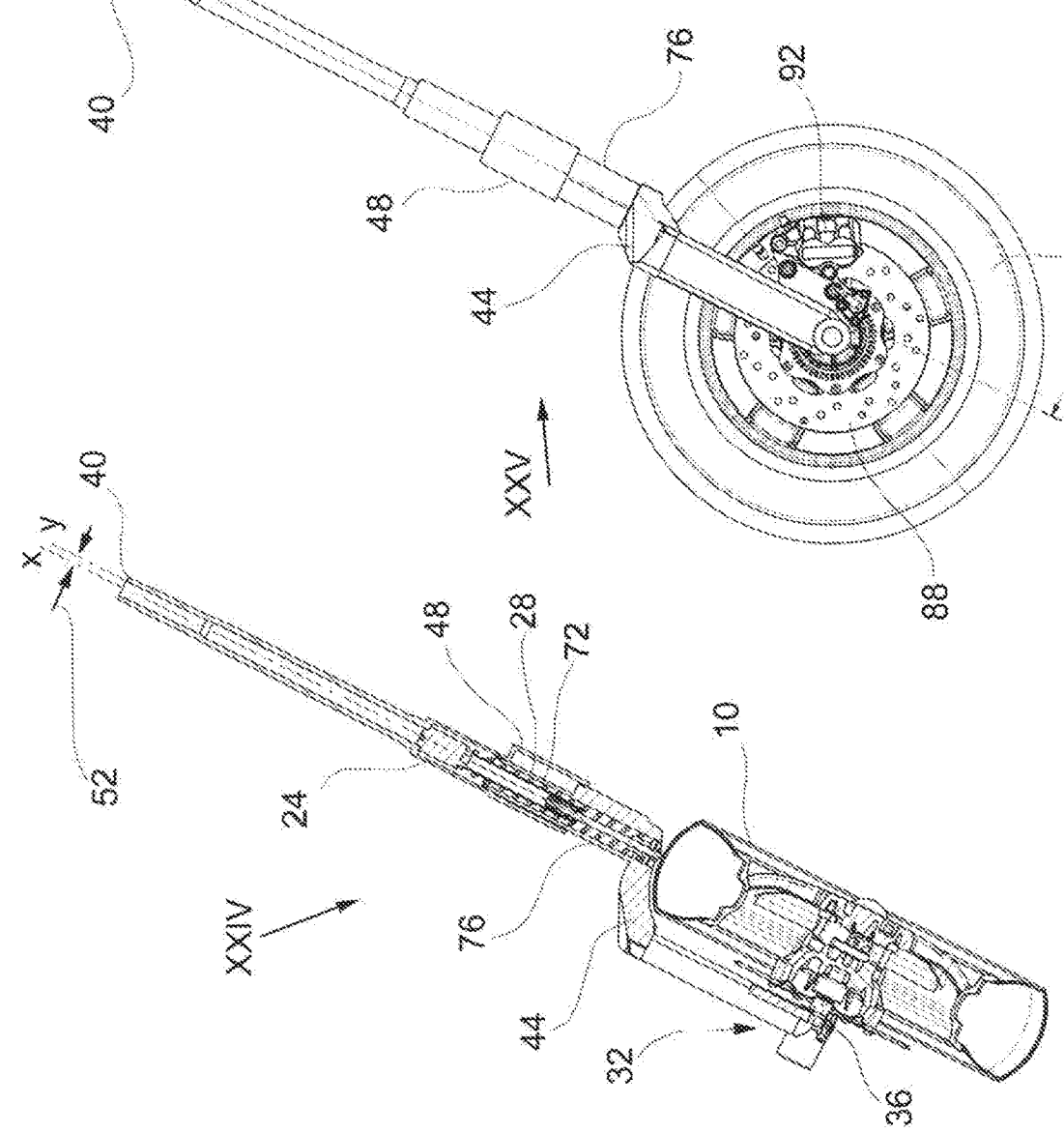
FIG. 22
FIG. 23

FRONT FORK OF A MOTOR VEHICLE

CROSS-REFERENCE TO RELATED APPLICATION

This application is the 35 U.S.C. § 371 national stage application of PCT Application No. PCT/I B2016/058017, filed Dec. 28, 2017, where the PCT claims the priority to and benefit of Italian Patent Application No. 102015000088081, filed Dec. 28, 2015, both of which are herein incorporated by reference in their entireties.

FIELD OF APPLICATION

This invention relates to a front fork of a motor vehicle, a forecarriage of a motor vehicle and a related motor vehicle.

STATE OF THE ART

As is known, in the art there are several fork solutions suitable to support one or more front wheels of motor vehicles.

In particular, the fork has the function of rotatably supporting the front wheel about a rotation axis of the wheel and, at the same time, transmitting the steering motion around a related steering axis.

In addition, the wheel must also be supported in the related shaking movement, along a shaking axis, so as to allow the related oscillation of the wheel with related damper.

So, it is clear that the suspension of the front wheel must perform a range of functions that significantly influence the dynamic behaviour of the vehicle.

In fact, the suspension supported by the fork must also ensure the ability to absorb the roughness of the ground: it is therefore necessary that the mobile parts of the fork can slide freely with each other, even under heavy load, such as for example in braking conditions, and that such mobile also be light so as to limit the unsprung masses. In fact, only in this way that one can improve the ability of the suspension and forecarriage to copy the roughness of the asphalt by improving the road holding and directionality of the front wheel in every condition. Furthermore, the deformation of the fork under load must always be very controlled not only in order to ensure the necessary smoothness of the suspension but also in order to provide the user with the right feeling of driving precision. In fact, it is obvious that, if the fork yields too much under load, albeit elastically, the user would have a poor sensation of the directionality of the vehicle.

It is clear that the need for robustness, in order to always ensure the best smoothness of the suspension and the correct directionality of the steering wheel and related precision in driving sensation, and the need to reduce the unsprung masses conflict with each other.

There is, then, a further technical problem to be solved, linked to the geometry and kinematics of steering during the diving/extension stroke, i.e., shaking, of the suspension of the fork.

In fact, a possible variation of the trail during the shaking motion would result in a real-time variation of steering sensitivity that would reduce the user's trust in the manoeuvrability and precision of driving. In general, an increase of the trail, typical in extension of the suspension, reduces steering sensitivity while a reduction of the trail, typical of compression of the suspension, increases steering sensitivity. The reason for this variation is given by the fact that the trail represents the arm applicable to the friction force exchanged between the tyre and the ground, with respect to the steering axis. So, a smaller trail implies a lower tendency of the steering to self-righting, i.e., to return to the central or straight-moving position; vice versa in the case of a greater trail.

In order to improve drive feel, it is advisable to have well-controlled variations of the trail during the shaking motion of the suspension and thus of the wheel: in this way the sensitivity of the wheel and therefore of the steering will not vary (with the exception of the inevitable variation due to load transfer in acceleration/deceleration).

A further need felt in the art is also that of reducing the costs of producing, assembling and maintaining the fork and thus of the forecarriage.

The above mentioned technical problems are accentuated in the case of vehicles with two wheels in the forecarriage at least one wheel at the rear, i.e., in the case of three-wheeled motor vehicles with at least one drive wheel in the rear and two steering and tilting wheels, i.e., rolling or inclinable, in the front.

In these vehicles, the rear wheel (or rear wheels) has the purpose of providing drive torque and therefore allowing traction, while the front wheels, in pairs, have the purpose of providing the directionality of the vehicle.

The use of two front wheels, instead of two rear wheels, allows avoiding the insertion of a differential for the transmission of torque. In this way, one obtains a reduction of cost and weight at the rear axle.

In addition to steering, the paired wheels in the forecarriage can also incline and roll: in this way, the vehicles are equivalent to a real motorcycle since, just like a motorcycle, the motor vehicle is able to incline in a curve.

Compared to a motor vehicle with only two wheels, such vehicles with two wheels paired in the forecarriage have greater stability provided by the double support of the front wheels on the ground, similar to that provided by a car.

The front wheels are kinematically connected to each other by means of kinematic mechanisms that ensure the same rolling and/or steering in a synchronous and specular manner, for example through the interposition of articulated quadrilaterals.

It is clear that in these specific vehicles the problems of steering, lightness, controlled flexibility and control of trail during shaking motions are further complicated by the interaction on the dynamics of the vehicles of the front wheels. In fact, if the two wheels do not have a symmetrical behaviour, for example subject to different deformations and shaking, different steering angles could be generated that would induce undesired torques to the handlebar/steering. These torques to the handlebar not only would substantially reduce the driver's confidence in the forecarriage of the vehicle but would also compromise the vehicle dynamics. For example, if the two front wheels had two steering angles significantly different from each other, the vehicle would have incorrect kinematics in curves and also in a straight line. Consider, for example, the not infrequent case, in which even in a straight direction, the vehicle encounters roughness that induces a different shaking between the wheels.

Lastly, but no less important in the case of a vehicle with two front wheels, the problem of reducing the unsprung masses, in order to improve the dynamics of the vehicle, is even more felt since the wheels are precisely two and the forecarriage is already structurally heavier than a classical solution of a motor vehicle with only one front wheel.

PRESENTATION OF THE INVENTION

To solve the above problems, to date the known art has adopted a variety of front fork solutions for motorcycles equipped with both one and two front wheels. There are for example forks of the conventional type having lower linings, supporting the wheel, and upper rods for connection with the handlebar, and also of inverted forks in which the linings are arranged superiorly and the rods inferiorly.

In the solutions listed above the fork is disposed astride the wheel to be supported.

Finally, there are forks in which the branches are not disposed astride the wheel to be supported but on one side of the wheel.

These solutions that support the wheel cantilevered are typically designed to facilitate replacement of the wheel in case of puncture.

These solutions also include solutions with one push or pull arm suspension.

These suspensions have the advantage of a greater smoothness because the arms are pivoted on roller bearings without the sliding of the fork linings, but also the limit of a high coupling of the braking force on diving of the fork. In the case of pulled arm (Vespa), there is a pro-dive effect, i.e., the braking force conveniently decomposed, along the line joining the ground point and the fulcrum (instantaneous centre of rotation of the wheel and of its ground point) and along the orthogonal to this; the first (F2) stresses the structure, while the second (F1) compresses the suspension.

With the push arm, one has the opposite effect, i.e., braking extends the suspension (anti-dive effect).

Obviously, the fact that the vehicle dives more or less in braking depends on the combination of the effect described above with the load transfer to the front due to deceleration.

The solution typically adopted to correct the effect of diving or extension involves the use of a second arm so that the suspension becomes a quadrilateral that allows ample opportunity to govern the centre of instantaneous rotation of the ground point and thus the coupling of forces.

Finally, double fork solutions are also known that support the wheel cantilevered. These solutions have the advantage of ensuring the constancy of the trail during shaking motions.

Nevertheless, none of the solutions described above are able to ensure the satisfaction of all the above-mentioned requirements or, in any case, the best compromise among them.

Therefore, none of the cited prior art solutions are able to optimise the requirements of stability, handling, smoothness in shaking, constancy of trail, economical production and assembly and bending stiffness described above.

Therefore, there is a need to solve the drawbacks and limitations mentioned in reference to the prior art.

This need is satisfied by a motor vehicle fork according to claim 1.

DESCRIPTION OF THE DRAWINGS

Further characteristics and advantages of this invention will be more understandable from the following description of its preferred and non-limiting examples of embodiments, in which:

FIGS. 1-2 are perspective views in separate parts of a motor vehicle fork according to an embodiment of this invention;

FIGS. 14a, 14b and 15 are perspective and plan views of motor vehicles according to embodiments of this invention;

FIG. 22 is a side view of a motor vehicle forecarriage according to a further embodiment of this invention;

FIG. 23 is a sectional view of the forecarriage of FIG. 22, along the section plane XXIII-XXIII of FIG. 22;

FIG. 25 is a side view of the forecarriage of FIG. 22, from the side of the arrow XXV of FIG. 22.

The elements, or parts of elements, in common between the embodiments described below will be indicated with the same reference numbers.

DETAILED DESCRIPTION

Figure 4:
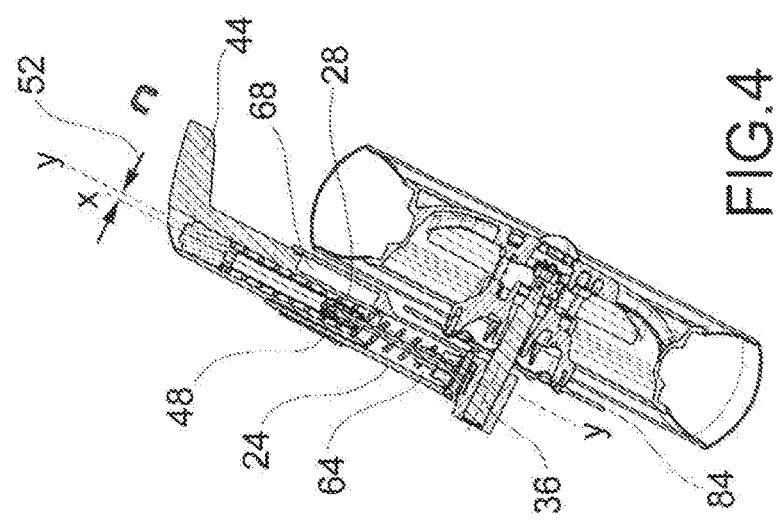
FIG. 4 is a sectional view of the forecarriage of FIG. 3, along the section plane IV-IV of FIG. 3.
Figure 5:
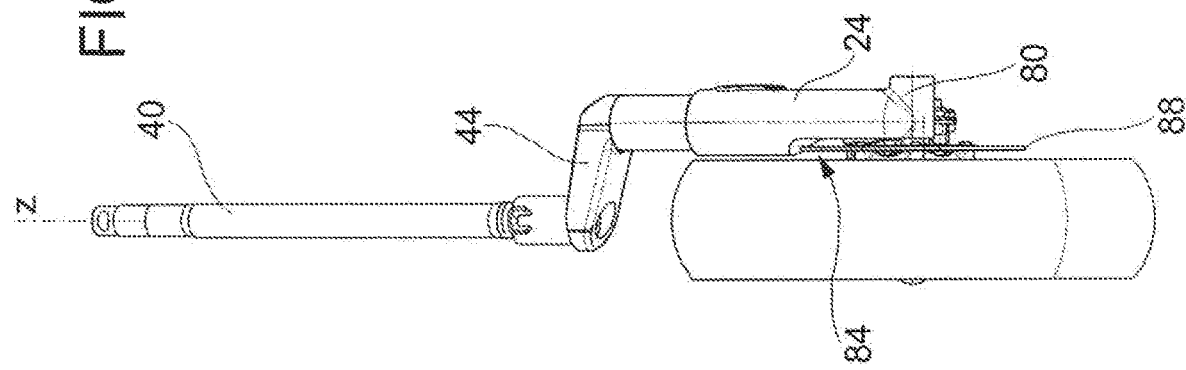
FIG. 5 is a side view of the forecarriage of FIG. 3, from the side of the arrow V of FIG. 3.
Figure 3:
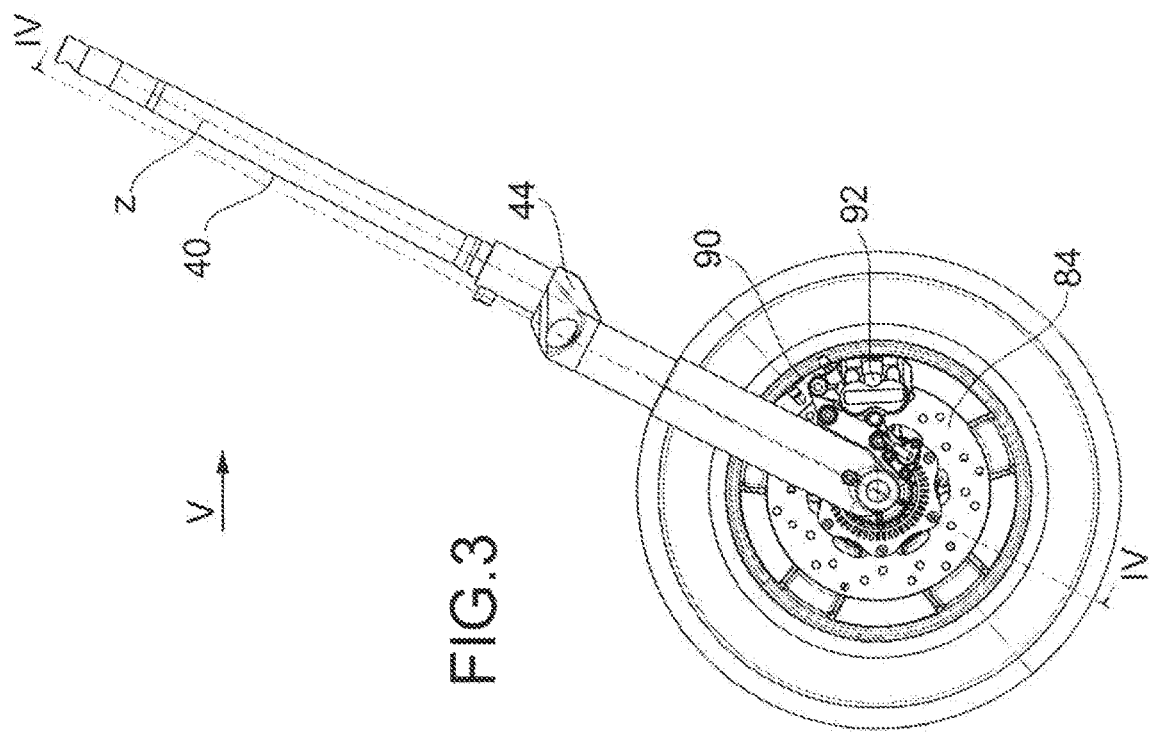
FIG. 3 is a side view of a motor vehicle forecarriage according to an embodiment of this invention.
Figure 6:
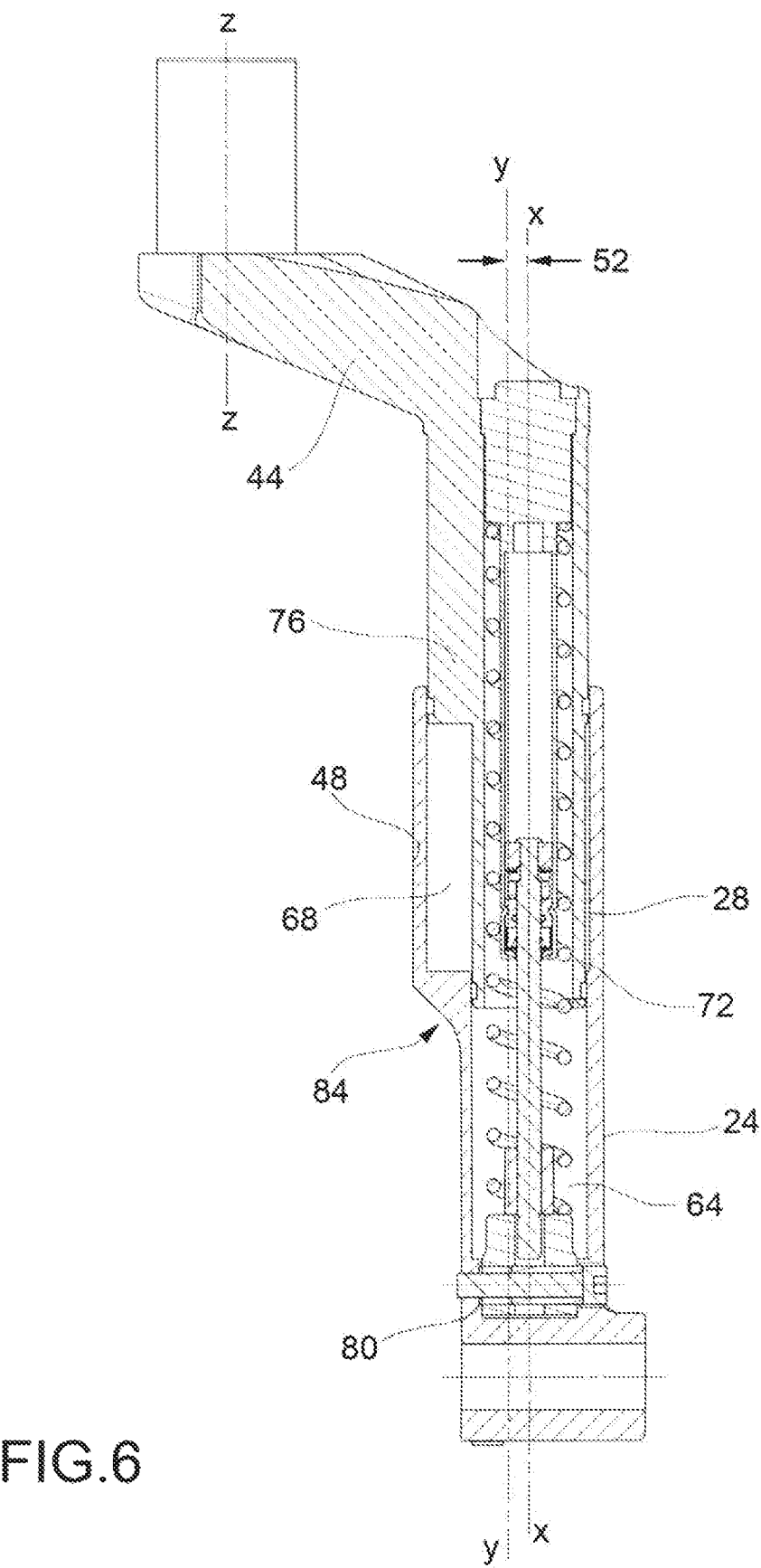
FIG. 6 is a sectional view of the fork of the motor vehicle forecarriage of FIG. 3.
Figure 8:
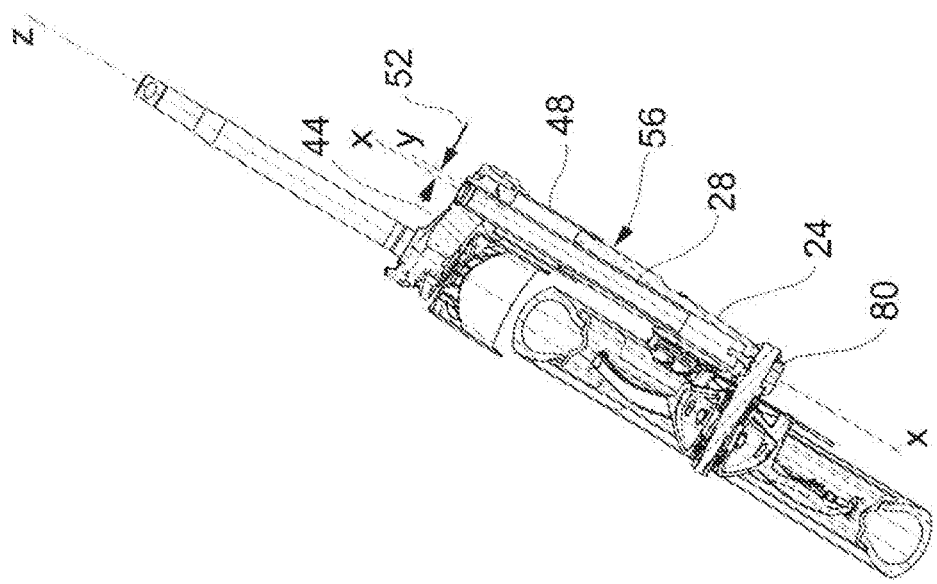
FIG. 8 is a sectional view of the forecarriage of FIG. 7, along the section plane VIII-VIII of FIG. 7.
Figure 9:
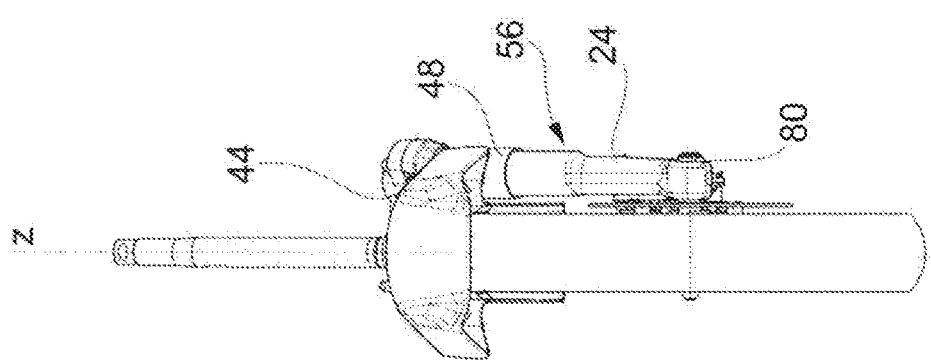
FIG. 9 is a side view of the forecarriage of FIG. 7, from the side of the arrow IX of FIG. 7.
Figure 7:
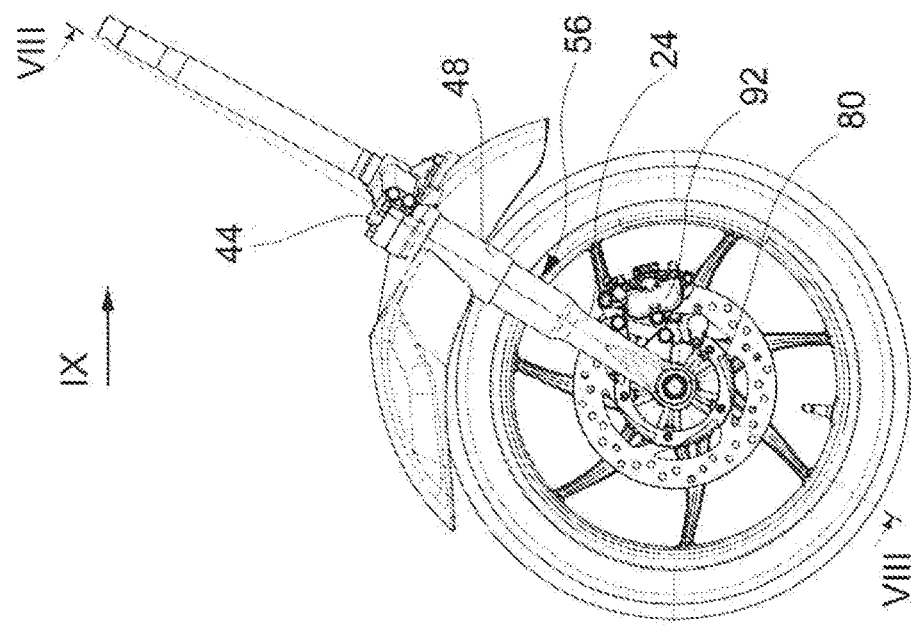
FIG. 7 is a side view of a motor vehicle forecarriage according to an embodiment of this invention, in configuration of extension of the suspension.
Figure 11:
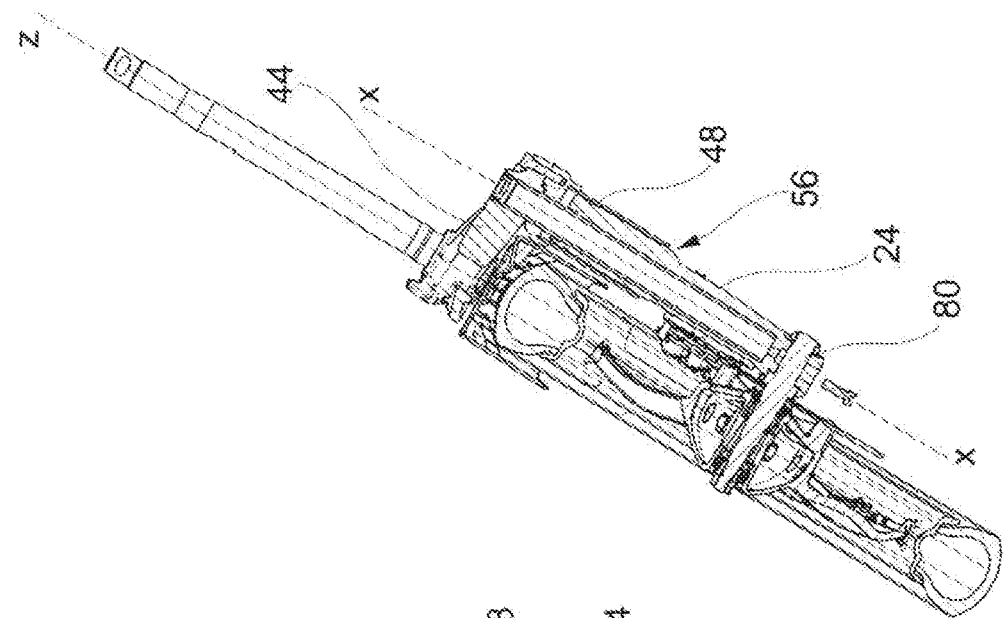
FIGS. 10-12 represent the corresponding views of Figures of 7-9 in configuration of compression of the suspension.
Figure 12:
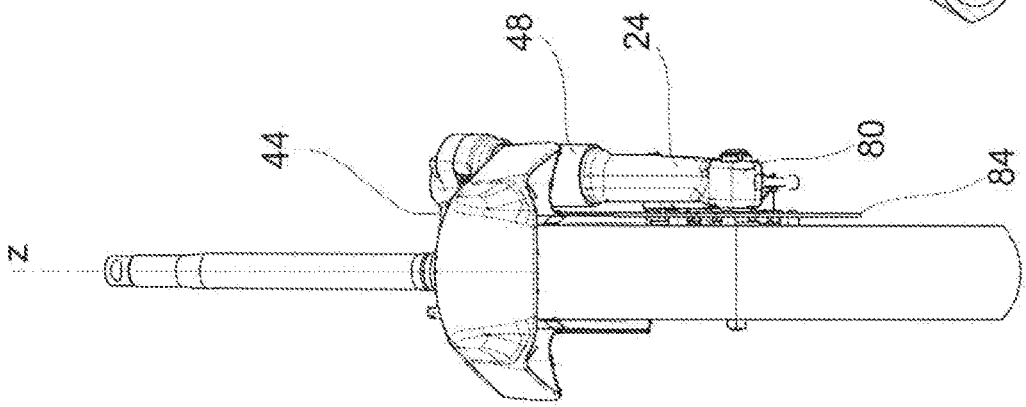
Figure 10:
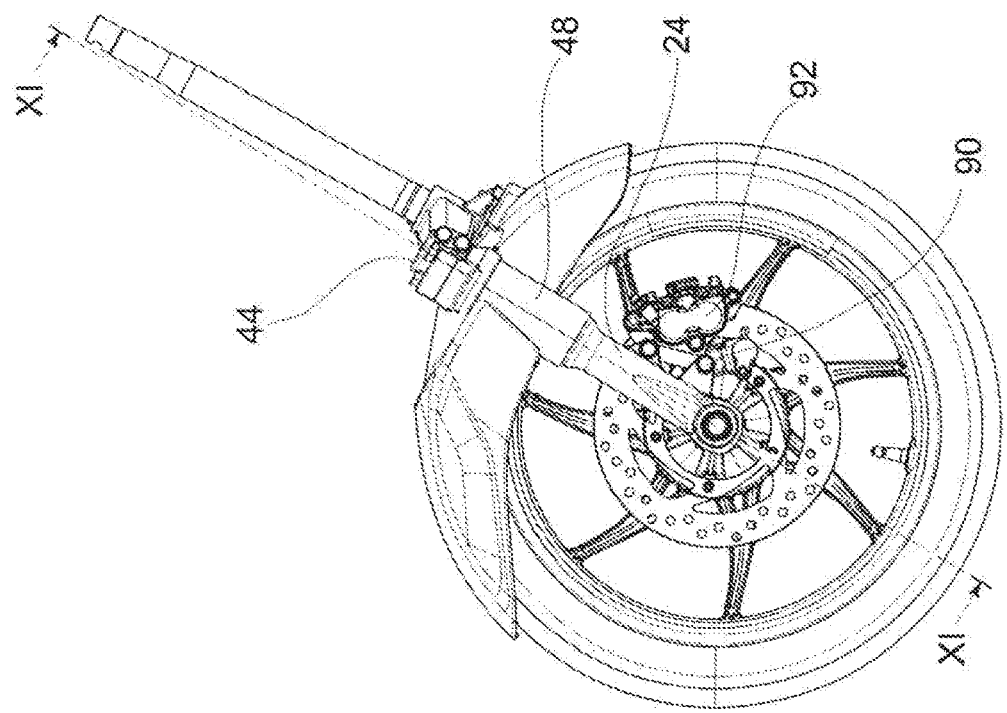
Figure 13:
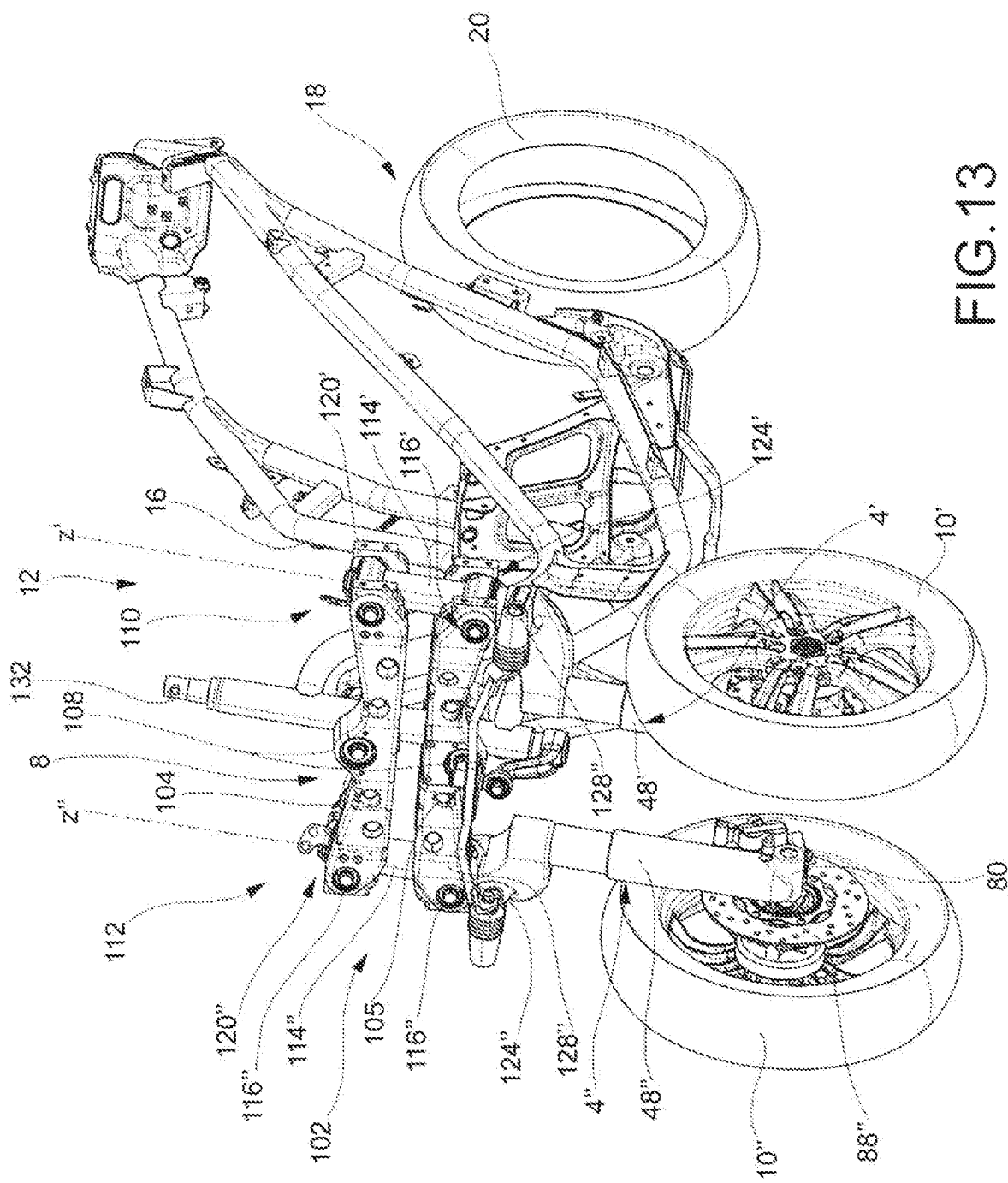
FIG. 13 is a perspective view of a motor vehicle according to an embodiment of this invention.
Figure 14A:
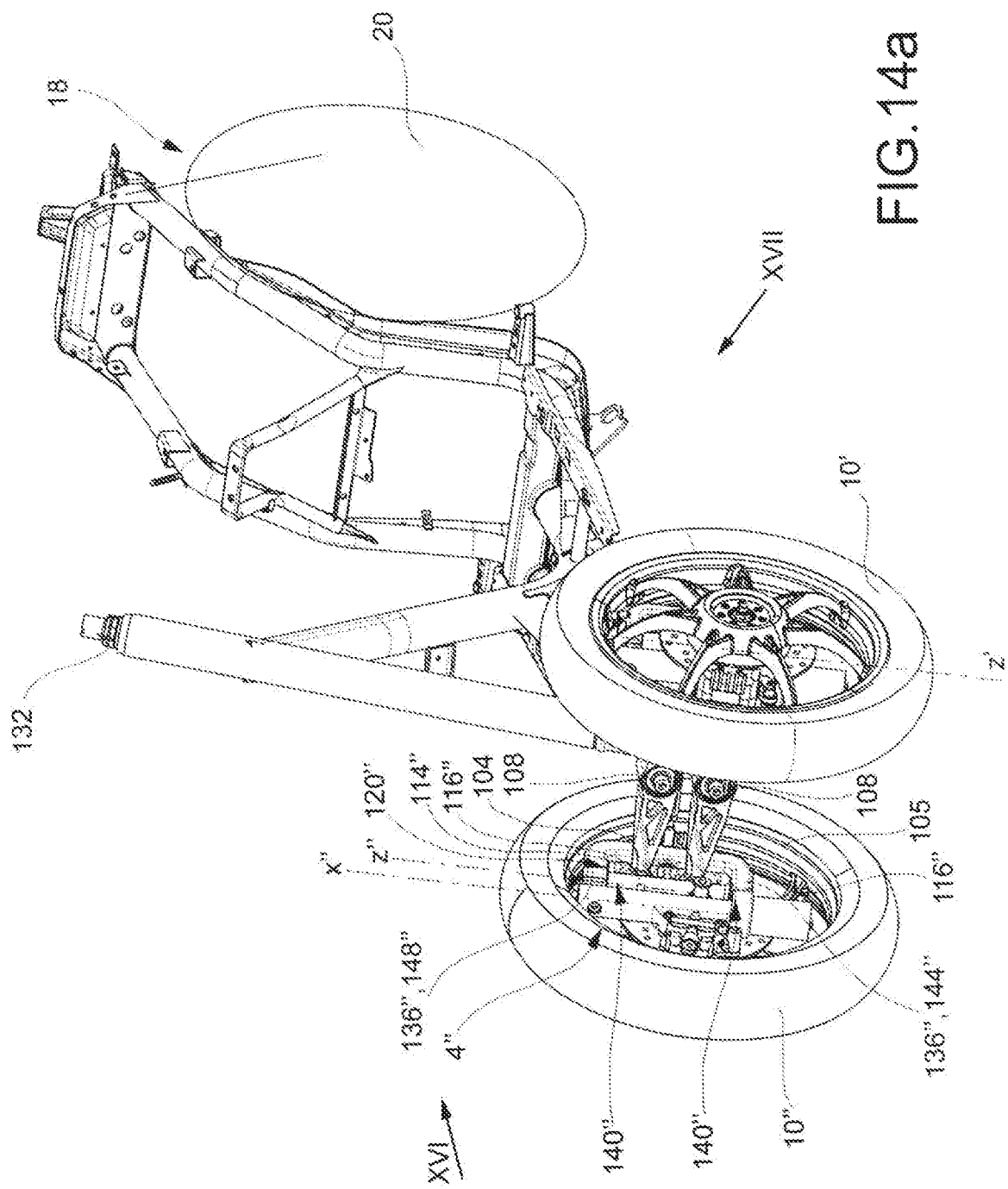
Figure 15:
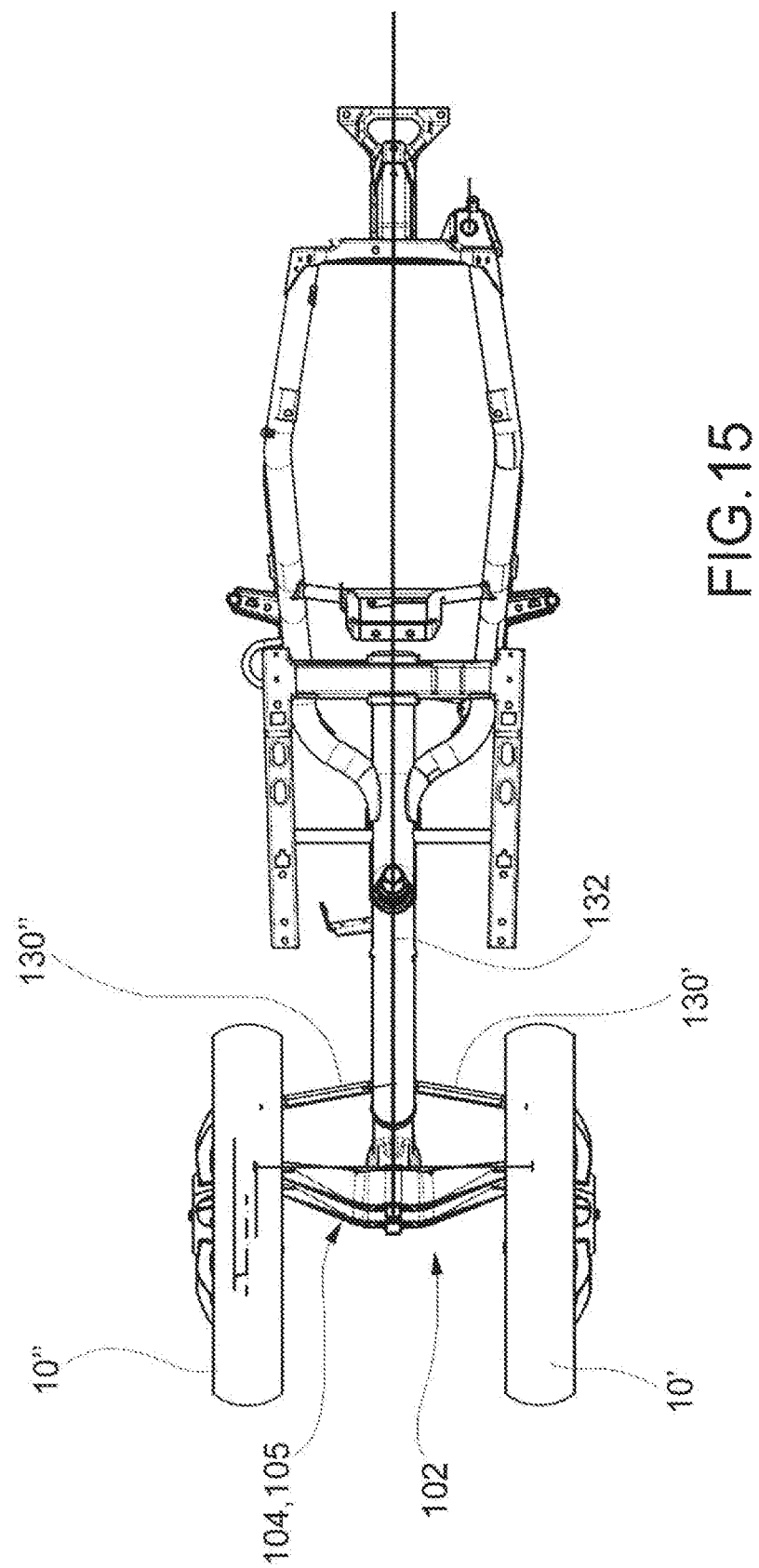
Figure 16:
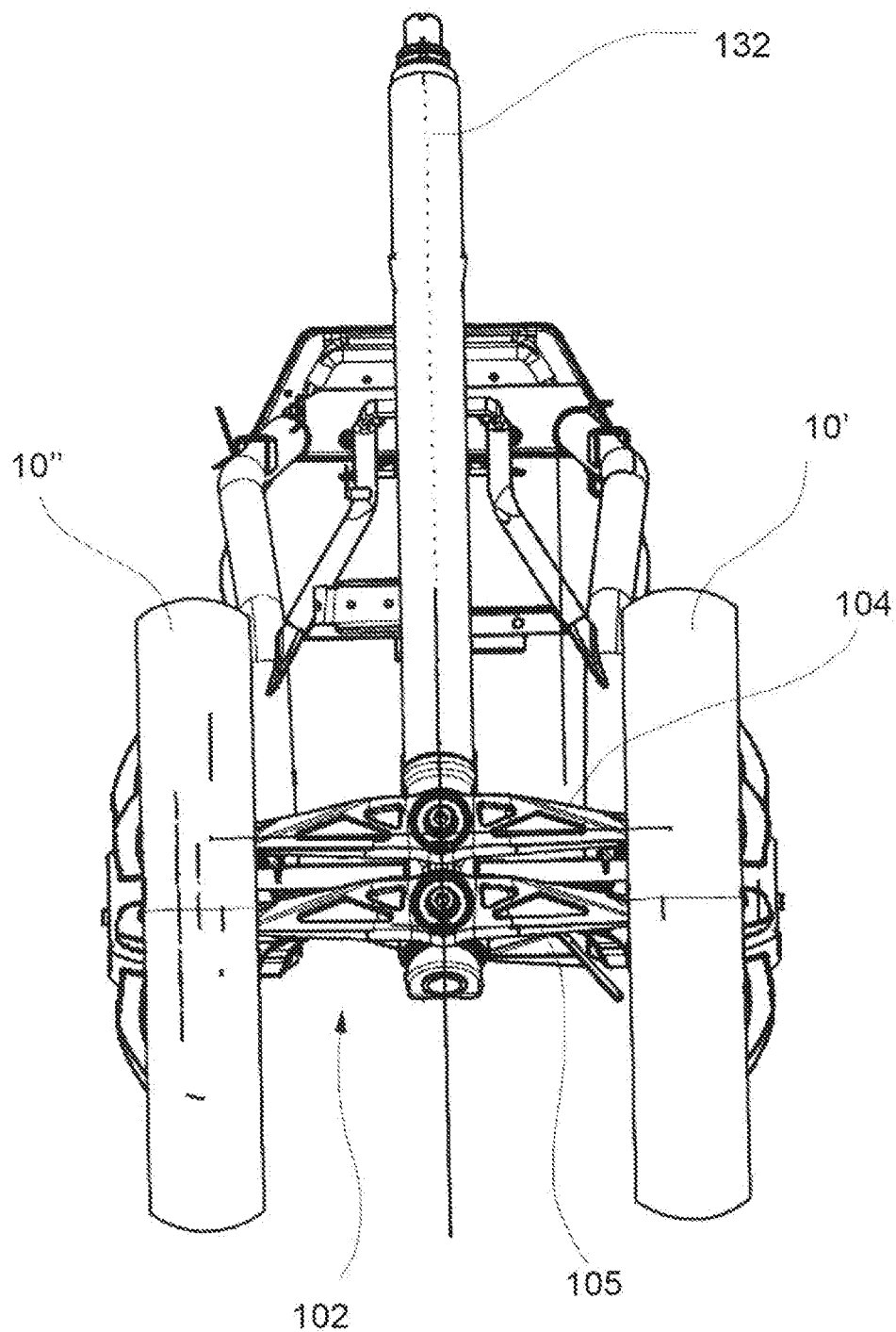
FIG. 16 is a front view of the motor vehicle of FIG. 14, from the side of the arrow XVI of FIG. 14.
Figure 17:
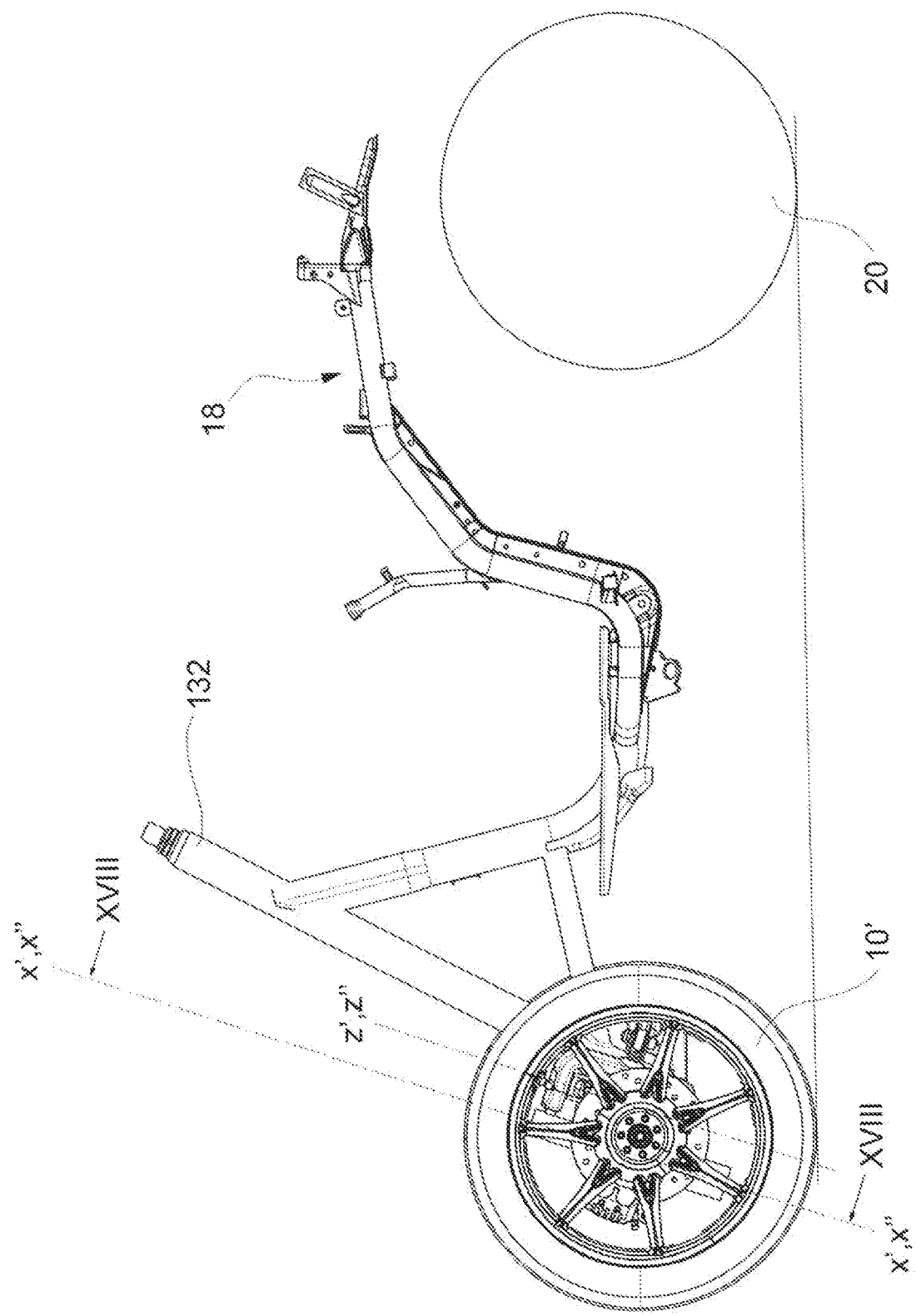
FIG. 17 is a side view of the motor vehicle of FIG. 14, from the side of the arrow XVII of FIG. 14.
Figure 18:
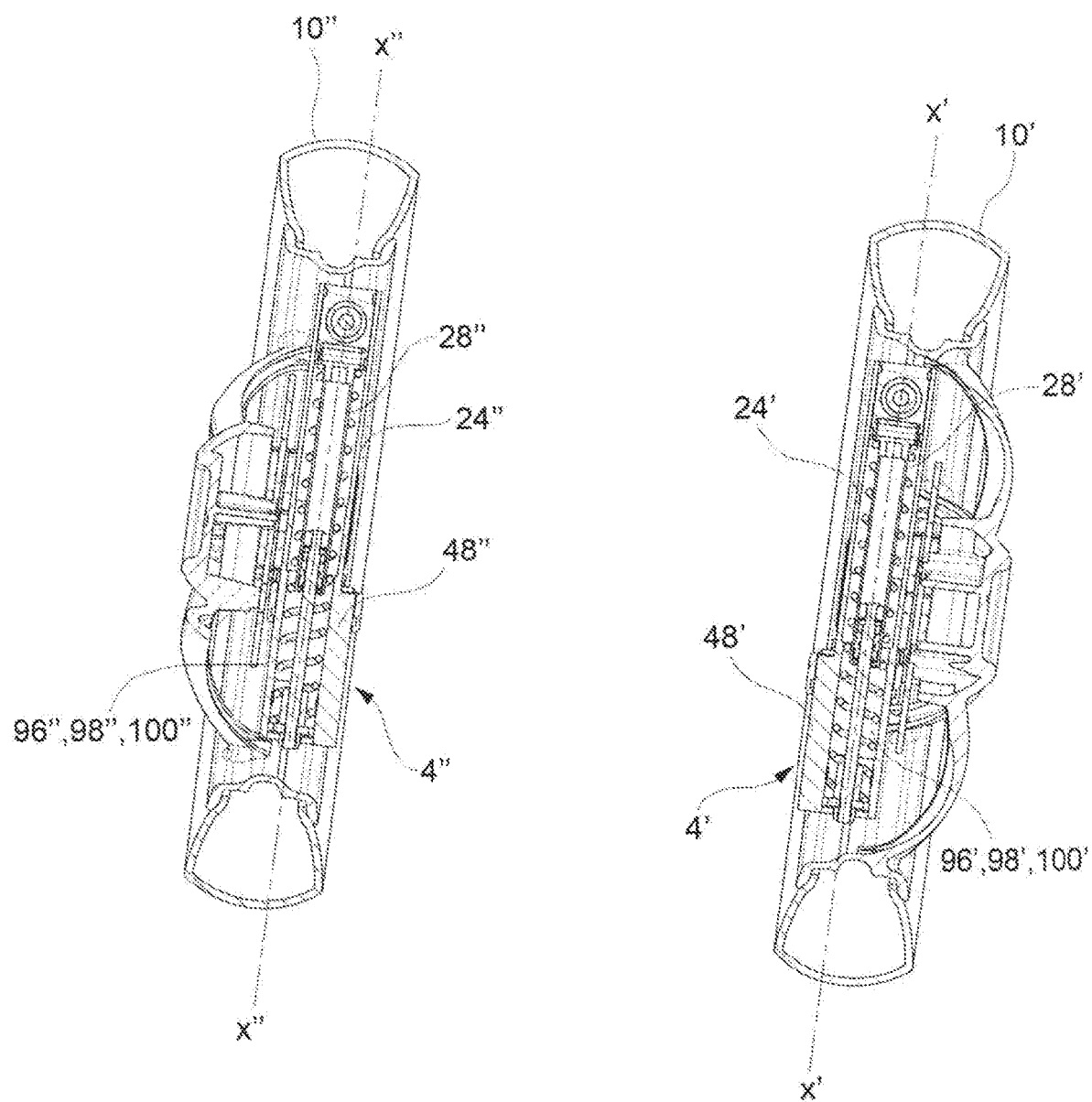
FIG. 18 is a sectional view of the motor vehicle of FIG. 17, along the section plane XVIII-XVIII of FIG. 17.

With reference to the above figures, reference number 4 globally indicates an overall schematic view of a fork of a forecarriage 8 of a motor vehicle 12 according to this invention.

For the purposes of this invention, it should be clarified that the term motor vehicle must be considered in broad sense, encompassing any motorcycle having at least three wheels, namely two front wheels, as better described below, and at least one rear wheel. So, the definition of motor vehicle also includes so-called quadricycles, having two wheels on the forecarriage and two wheels on the rear.

The motor vehicle 12 comprises a frame 16 that extends from a forecarriage 8, which supports at least two front wheels 10, to a rear end 18 that supports one or more rear wheels 20.

As regards the motor vehicle front fork 4, this comprises a first lining 24 and a first stem 28, wherein the first stem 28 slides axially with a shaped coupling inside the first lining 24 along a first sliding axis X-X, the first stem 28 being at least partially cylindrical with circular cross-section and coaxial to said first sliding axis X-X.

The first stem 28 and the first lining 24 are associated one to a hub 32 configured to rotatably house the rotation pin 36 of an axle journal of a wheel 10 and the other to a steering column 40 by means of a bracket 44, or vice versa.

In the case of a forecarriage having a single front wheel 10, the steering column 40 also it defines the steering axis Z-Z of the vehicle.

Figure 19:
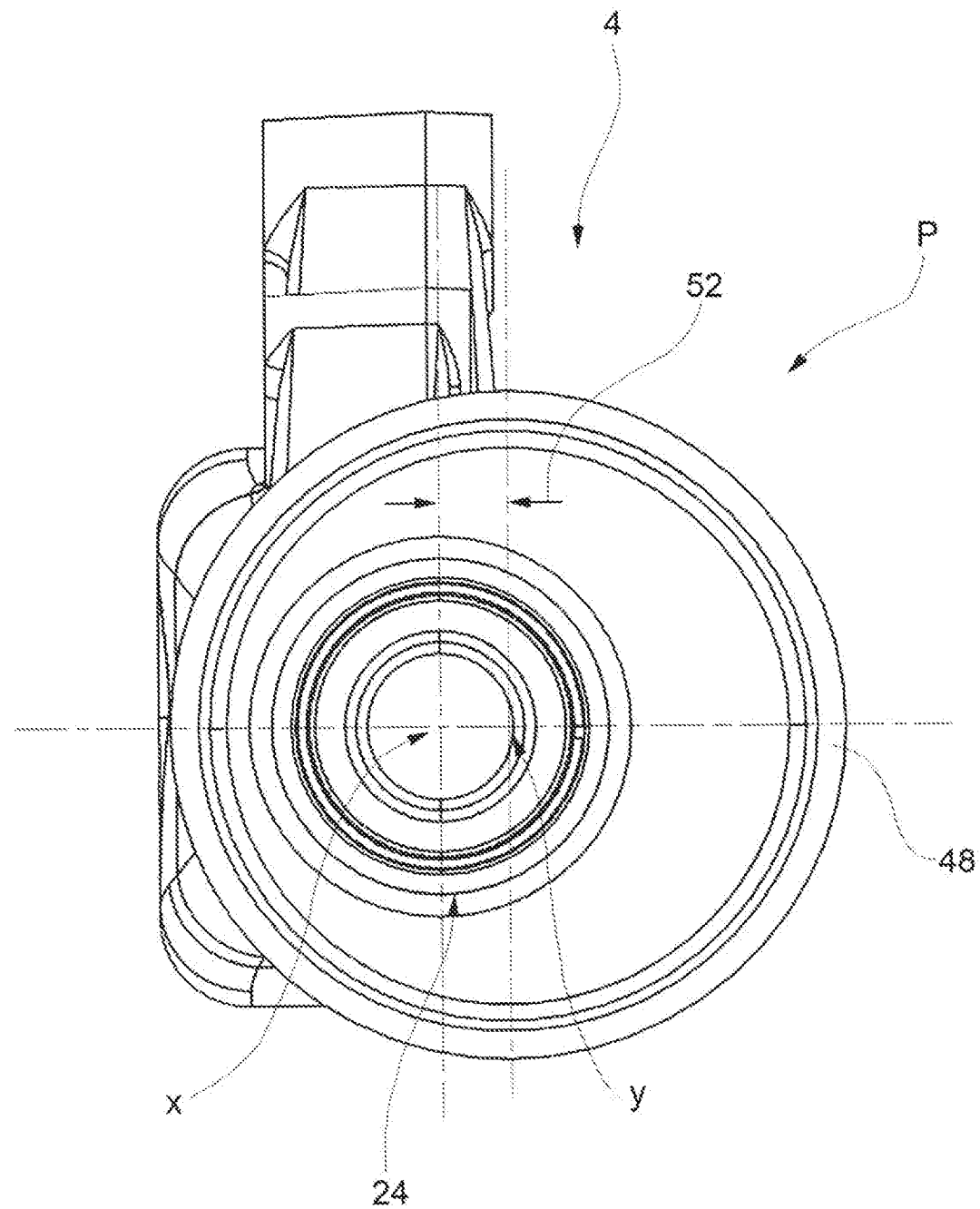
FIG. 19 is a construction in plan of the motor vehicle fork according to this invention.
Figure 20:
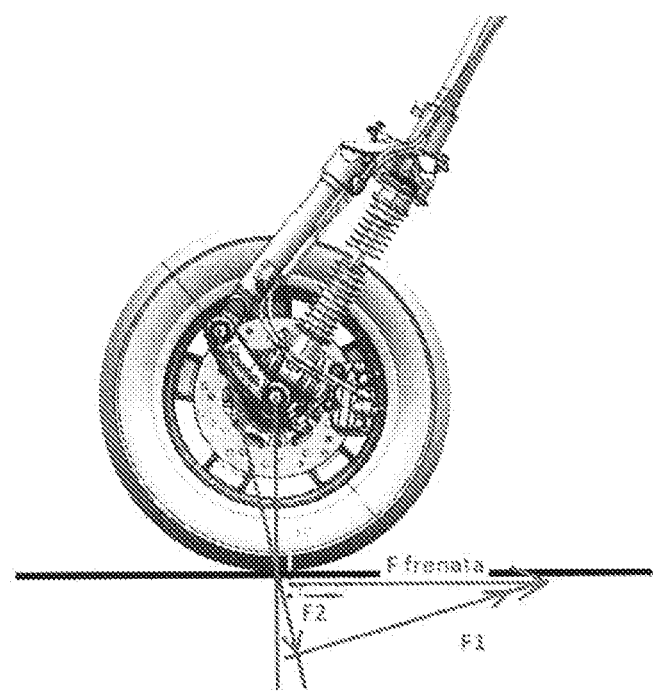
FIGS. 20-21 show side views of pulled or pushed arm forecarriage solutions of the known art.
Figure 21:
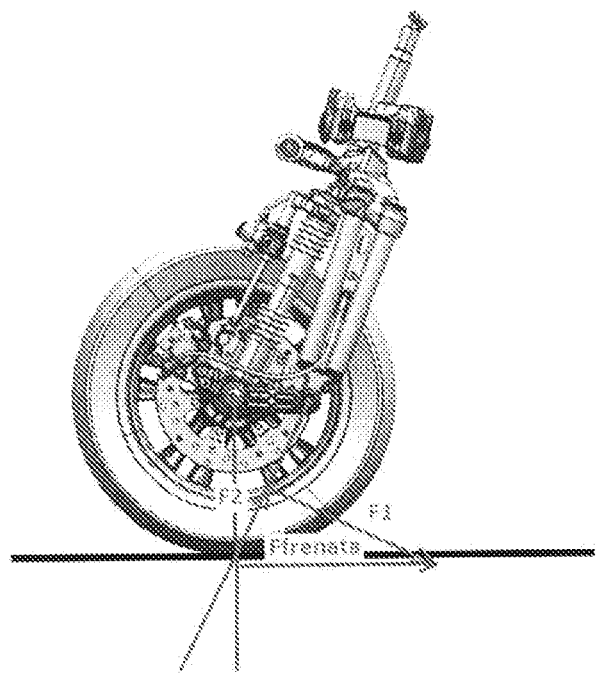
Figure 24:
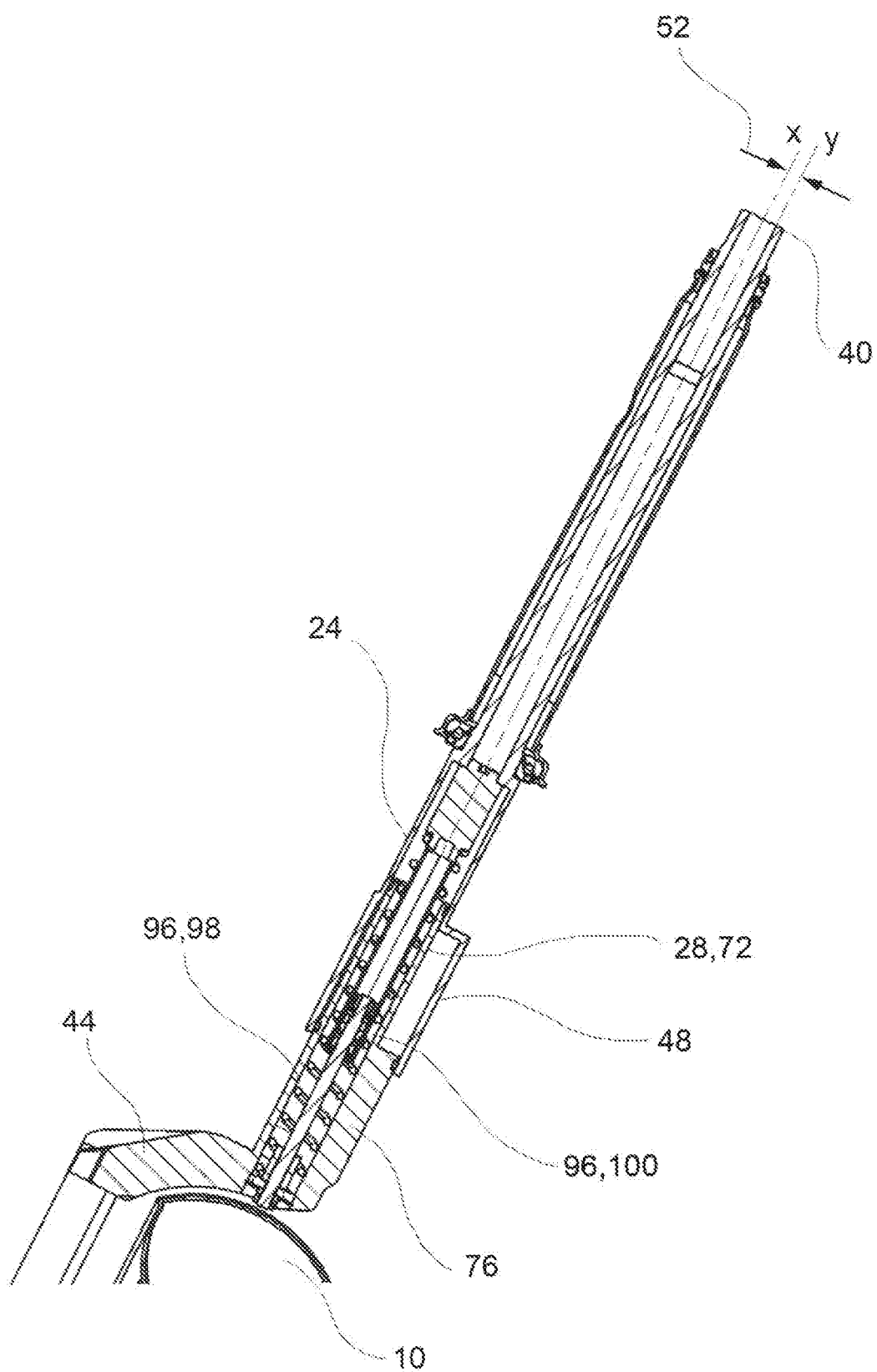
FIG. 24 is a view of the enlarged detail XXIV of FIG. 23.

The fork 4 also comprises a second lining 48, integral in rotation with the first lining 24, arranged so that, with respect to a projection plane P perpendicular to the first sliding axis X-X, the projection area of the first lining 24 is eccentrically contained in the projection area of the second lining 48 (FIG. 19).

"Integral in rotation" means that the first and second lining, in the assembly configuration of the fork, cannot mutually rotate between them.

The second lining 48 is integrally attached to said hub 32 or to said steering column 40.

According to an embodiment, the second lining 48 is associated with the first lining 24 according to a cylindrical shaped coupling with circular cross-section with respect to a second sliding axis Y-Y, the second sliding axis Y-Y is parallel to the first sliding axis X-X and distanced from it by an eccentricity 52.

According to an embodiment (FIGS. 1-2, 7-12), the second lining 48 slides axially relative to the first lining 24, parallel to said first and second sliding axes X-X,Y-Y. Therefore, in this embodiment the linings are physically separated from each other but, in the assembly configuration of the fork 4, the first and the second lining 24,48 can translate, but not rotate mutually with respect to the sliding axes X-X and Y-Y.

According to an embodiment, the first stem 28 and the second lining 48 are attached to a steering bracket 44 integral in rotation with the steering column 40.

For example, this attachment can take place by means of the interposition of a cover 54, between the steering bracket 44 and said first stem 28 and second lining 48. For example, the cover 54 comprises seats 55 that house according to a forced coupling ends of the first stem 28 and the second lining 48 (FIGS. 1-2).

The second sheath 48 is internally cylindrical with a circular section and is counter-shaped with respect to an outer side wall 56 of the first lining 24.

Preferably, between the second lining 48 and the first lining 24 is interposed a sliding bushing 60 that serves as a seal between said linings 24,48.

According to a further embodiment (FIGS. 3-6), the first and second linings 24,48 are in one piece with each other so as to respectively define a first cylindrical chamber 64 defining the first sliding axis X-X, and a second cylindrical chamber 68 defining a second sliding axis Y-Y parallel to the first sliding axis X-X and distanced from it by an eccentricity 52.

For example, first stem 28 comprises, in one piece with each other, a first protuberance 72 counter-shaped and at least partially inserted in the first cylindrical chamber 64 and a second protuberance 76 counter-shaped and at least partially inserted in the second chamber 68, said protuberances 72,76 being symmetric with respect to the corresponding first and second sliding axes X-X,Y-Y distanced from each other by said eccentricity 52.

According to a possible embodiment of this invention, the first lining 24 comprises an attachment foot 80 to a hub 32 to attach the associable wheel 10, and at least one recess 84 for the at least partial housing of a brake disc 88 integral with said associable wheel 10.

The recess 84 preferably develops parallel to said first sliding axis X-X so as to allow the partial housing of the brake disc 88.

Preferably, the first lining 24 comprises attachment means 90 of a disc brake calliper 92.

According to this invention, the fork 4 comprises elastic suspension means 96 interposed between the hub 32 and the steering column 40 to form the suspension of the associable wheel 10 supported by the hub 32 and to control the axial sliding movement of the first stem 28 inside the first lining 24 along the first sliding axis X-X.

According to an embodiment, said elastic suspension means 96 are arranged inside the first lining 24 and/or inside the second lining 48.

It is also possible to position said elastic suspension means 96 are at least partially outside the first lining 24 and/or the second lining 48.

For example, said elastic suspension means 96 comprise a spring 98 and/or a damper 100.

As described above, the forecarriage 8 comprises a fork 4 as described, wherein the first lining 24 is connected to a rotation pin 36 of an axle journal of a vehicle front wheel 10, in order to support it in rotation, and the first stem 28 is connected, via a bracket 44 to a first steering column 36 of the vehicle.

This invention also finds advantageous application to vehicles having a forecarriage 8 provided with two front wheels 10',10", each supported by a front fork 4.

In the case of a vehicle having two front wheels the superscripts "'" and "''" will be used to distinguish the specular components of each wheel 10' and 10".

The motor vehicle forecarriage 8 comprises a front end chassis 16 and a pair of front wheels 10',10" kinematically connected to the front end chassis 16 by means of an articulated quadrilateral 102.

In particular, said articulated quadrilateral 102 comprises a pair of cross-members, i.e., an upper cross-member 104 and a lower cross-member 105, hinged to the front end chassis 16 at median hinges 108.

The upper and lower cross-members 104, 105 are connected to each other, in correspondence of opposite transverse ends 110, 112, by means of uprights 114', 114" pivoted to said transverse ends 110,112 in correspondence of the side hinges 116',116".

Each cross-member 114',114" extends from an upper end 120',120" to a lower end 124',124", the upper end (120',120" facing the upper cross-member 104 and the lower end 124',124" facing the lower cross-member 105. The upper and lower cross-members 104,105 and the uprights 114', 114" define said articulated quadrilateral 102.

To each upright 114',114" is rotatably connected to a front fork 4',4" around a corresponding first and second steering axis Z'-Z',Z"-Z" of each corresponding wheel 10',10".

Each steering axis Z'-Z',Z"-Z" can be positioned at a hinge between the fork 4',4" and the corresponding upright 114', 114".

For example it is possible to provide for fixing a bracket 44',44" to each corresponding first stem 28',28" in order to be able to command the rotation of the fork 4',4". Said bracket 44',44" is in turn hinged to the respective upright 114',114" in correspondence with a related steering hinge 128',128". Preferably, said steering hinges 128',128", which define the first and the second steering axis Z'-Z',Z"-Z" are positioned in correspondence of the lower ends 124',124" of the respective uprights 114',114".

As regards the command of the steering rotation of said forks 4',4", this can be achieved by means of lever mechanisms of various types, typically of steering tie-rods 130', 130", connected both to the brackets 44',44" and to a handlebar of the motor vehicle rotatable about a central column 132.

According to a further embodiment, the forecarriage comprises the articulated quadrilateral 102 and said forks 4',4". In particular, each fork 4',4" is pivotally connected to a corresponding upright 114',114" for example by the interposition of a 'C' bracket 136',136". The 'C' bracket 136', 136" is hinged to each upright 114',114" at a pair of pins 140',140" aligned with each other so as to define the steering axes Z'-Z',Z"-Z" of each wheel 10',10".

The 'C' bracket 136',136" engages on the corresponding fork 4',4" so as to enclose the corresponding upright 114', 114". To allow the suspension and therefore the shaking movement of the wheel 10',10" the connection between the 'C' bracket 136',136" and the fork 4',4" allows a relative axial movement parallel to said first and second sliding axes X-X,Y-Y.

For example, a lower branch 144',144" of the 'C' bracket 136',136" is solidly fixed to the second lining 48',48" and an upper branch 148',148" of the 'C' bracket 136',136" is integral with the first stem 28', 28". The lower and upper branches of the 'C' bracket are integral with each other, therefore during the shaking motion, the first stem 28',28" moves with respect to the first lining 24',24" and to the second lining 48',48".

For example, the first lining 24',24" is provided with an axial groove 152',152" to allow the relative movement between the first lining 24',24" and the upper branch 148', 148" of the 'C' bracket 136', 136".

Each 'C' bracket 136',136" is for example hinged to a corresponding steering tie-rod 130',130" by means of respective hinge means 138',138".

Preferably, as seen, each fork 4',4" comprises internally elastic suspension means 96',96" provided with a spring 98',98" and/or a damper 100',100".

The 'C' bracket 136',136" is in turn connected to the steering tie-rods 130',130", kinematically connected to a handlebar of the motor vehicle rotatable around a central column 132.

As can be appreciated from the description, this invention allows overcoming the drawbacks presented in the prior art.

Advantageously, this invention improves the dynamic behaviour of the vehicle with respect to the prior art solutions.

In fact, both steering straight and in curves, the two wheels maintain precise control of the trail; therefore, there are no steering effects induced by the roughness of the road or by the actual shaking conditions of the suspensions.

The suspensions are at the same time rigid in guiding the wheel, even under the action of the dynamic load in braking and acceleration.

Moreover, this invention also ensures driving precision not found today in tilting three or four-wheeled vehicles. In fact, the driver has always has the feeling of remarkable steering precision, i.e., has the sensation of a remarkable and easy directionality of the vehicle, without having any abnormal reaction to steering, even in bending conditions.

Furthermore, despite the cantilever suspension of the front wheel or front wheels, this invention allows realising a guide to the shaking of each wheel that is very robust wheel and with limited bending, so as not to stutter even under high load (for example in braking and/or cornering).

So, the fork according to this invention provides reduced dimensions, light weight and also high flexural stiffness.

Finally, the motor vehicle according to this invention is able to ensure not only high stability, superior to that of a motor vehicle with two wheels, thanks to the presence of two paired front wheels, but also a remarkable handling and ease of bending, typical of a motor vehicle with only two wheels.

In these types of vehicles, this invention allows obtaining a reduction of the masses and a specularity of behaviour of the steering and tilting front wheels.

In fact, since the related forks of the front wheels, as seen, guarantee a precise control of the trail during their excursion and a high resistance to bending, they allow having consistent steering of the wheels that induce self-righting torques on the handlebar. The driver therefore perceives driving precision and reliability in the trajectory imposed. Also driving straight ahead, for example, when the wheels encounter an asymmetric obstacle, the behaviour of the forks is reliable. Furthermore, as seen, the unsprung masses are reduced compared to known solutions that provide for the use of conventional forks astride each wheel.

Forks with cantilevered support of the front wheels are particularly advantageous in the case of vehicles with two front wheels paired with each other: in fact, in these forecarriages with twin wheels have reduced spaces for maintenance; a cantilever suspension facilitates maintenance, dismantling and replacement of the wheels.

A person skilled in the art, in order to satisfy contingent and specific needs, may make numerous modifications and variations to the solutions described above, all however contained within the scope of the invention as defined by the following claims.

The invention claimed is:

1. A front fork of a motor vehicle comprising:
 a first lining and a first stem,
 where the first stem slides axially inside the first lining along a first sliding axis, the first stem being at least partially cylindrical with circular cross-section and coaxial to said first sliding axis,
 wherein the first stem and the first lining are associated one to a hub configured to rotatably house a rotation pin of an axle journal of a wheel and the other to a steering column by means of a bracket,
 a second lining, integral in rotation with the first lining, arranged so that, with respect to a projection plane perpendicular to the first sliding axis, the projection area of the first lining is eccentrically contained in the projection area of the second lining,
 the second lining being integrally attached to said hub or to said steering column.

2. The front fork of a motor vehicle according to claim 1, wherein the second lining is associated with the first lining according to a cylindrical shaped coupling with circular cross-section with respect to a second sliding axis, the second sliding axis being parallel to the first sliding axis and distanced from it by an eccentricity.

3. The front fork of a motor vehicle according to claim 2, where the second lining slides axially relative to the first lining, parallel to said first axis and said second sliding axis.

4. The front fork of a motor vehicle according to claim 1, wherein the first stem and the second lining are attached to a steering bracket integral in rotation with the steering column.

5. The front fork of a motor vehicle according to claim 1, wherein the second lining is internally cylindrical with circular cross-section and counter-shaped to an outer side wall of the first lining and wherein, between the second lining and the first lining a sliding bushing is interposed which acts as a seal between said first and second linings.

6. The front fork of a motor vehicle according to claim 1, wherein the first and second linings are in one piece with each other so as to respectively define a first cylindrical chamber defining the first sliding axis, and a second cylindrical chamber defining a second sliding axis parallel to the first sliding axis and distanced from it by an eccentricity.

7. The front fork of a motor vehicle according to claim 6, wherein the first stem comprises a first protuberance counter-shaped and at least partially inserted in the first cylindrical chamber and a second protuberance counter-shaped and at least partially inserted in the second chamber, said protuberances being symmetric with respect to the corresponding first and second sliding axes distanced from each other by said eccentricity.

8. The front fork of a motor vehicle according claim 1, wherein the first lining comprises an attachment foot to a hub to attach the associable wheel, and at least one recess for the at least partial housing of a brake disc integral with said associable wheel.

9. The front fork of a motor vehicle according to claim 1, wherein said first lining comprises attachment means of a disc brake caliper.

10. The front fork of a motor vehicle according to claim 1, wherein the fork comprises elastic suspension means interposed between the hub and the steering column to form the suspension of the associable wheel supported by the hub and to control the axial sliding movement of the first stem inside the first lining along the first sliding axis.

11. The front fork of a motor vehicle according to claim 10, wherein said elastic suspension means are arranged inside the first lining and/or inside the second lining.

12. The front fork of a motor vehicle according to claim 10, wherein said elastic suspension means are arranged at least partially outside the first lining and/or the second lining.

13. The front fork of a motor vehicle according to claim 10, wherein said elastic suspension means comprise a spring and/or a damper.

14. A motor vehicle forecarriage comprising a front fork according to claim 1, wherein the first lining is connected to the rotation pin of the axle journal of the front wheel of the motor vehicle, in order to support it in rotation, and the first stem is connected, via a bracket to a first steering column of the motor vehicle.

15. The forecarriage according to claim 14, wherein the front end comprises two front wheels, each supported by a front fork.

16. A motor vehicle forecarriage comprising:
a front end chassis,
a pair of front wheels mechanically connected to the front end chassis by means of an articulated quadrilateral,
said articulated quadrilateral comprising an upper cross-member and a lower cross-member, hinged to the front end chassis at median hinges,
said cross-members being connected together, at opposite transversal ends by uprights pivoted at said transversal ends at side hinges, each upright extending from an upper end to a lower end, the upper end facing the upper cross-member and the lower end facing the lower cross-member
the cross-members and the uprights defining said articulated quadrilateral,
wherein each upright is rotatably connected to a front fork according to claim 1, around a corresponding first and second steering axis of each corresponding wheel.

17. The forecarraiage according to claim 16, wherein the bracket of each said fork is rotatably engaged in said lower end of each upright of the articulated quadrilateral.

18. The forecarraiage according to claim 16, wherein said bracket of each said fork is fixed to each corresponding first stem in order to control rotation of the respective fork, each said bracket is in turn hinged to the respective upright at a relative steering hinge, said steering hinges defining the first and the second steering axes.

19. The forecarraiage according to claim 18, wherein a steering tie-rod is connected to each bracket and to a motor vehicle handlebar rotatable around a central column, to achieve control of a steering rotation of said forks.

20. The forecarraiage according to claim 16, wherein each said fork is rotatably connected to the corresponding upright through the interposition of a 'C' bracket, each said 'C' bracket being hinged to each upright at a pair of pins aligned with each other so as to define the first and second steering axes.

21. The forecarraiage according to claim 20, wherein each said 'C' bracket engages on the corresponding fork so as to enclose the corresponding upright, and wherein, to allow a shaking movement of the respective wheel the connection between each said 'C' bracket and the respective fork allows a relative axial movement parallel to said first sliding axis.

22. The forecarraiage according to claim 20, wherein a lower branch of each said 'C' bracket is integrally fixed to the second lining of the respective fork and an upper branch of each said 'C' bracket is integral with the first stem of the respective fork, wherein the lower and upper branches of the 'C' brackets are integral with each other, and wherein the forks are configured so that during a shaking movement, each respective first stem translates with respect to the respective first and second linings.

23. The forecarraiage according to claim 22, wherein each said first lining is provided with an axial groove to allow relative movement between the first linings and the upper branches of the 'C' brackets.

24. The forecarraiage according to claim 20, wherein each said 'C' bracket is connected to a steering tie rod that is mechanically connected to a handlebar of the motor vehicle rotatable around a central column.

25. The forecarraiage according to claim 16, wherein each fork comprises internally elastic suspension means provided with a spring and/or a damper.

26. A motor vehicle comprising a front fork and a forecarriage, wherein the front fork comprises:
a first lining and a first stem,
where the first stem slides axially inside the first lining along a first sliding axis, the first stem being at least partially cylindrical with circular cross-section and coaxial to said first sliding axis,
wherein the first stem and the first lining are associated one to a hub configured to rotatably house a rotation pin of an axle journal of a wheel and the other to a steering column by means of a bracket, or vice versa,
a second lining, integral in rotation with the first lining, arranged so that, with respect to a projection plane perpendicular to the first sliding axis, the projection area of the first lining is eccentrically contained in the projection area of the second lining,
the second lining being integrally attached to said hub or to said steering column;
and wherein the forecarriage comprises:
the front fork, wherein the first lining is connected to the rotation pin of the axle journal of a front wheel of the motor vehicle, in order to support it in rotation, and the first stem is connected, via a bracket to the steering column of the motor vehicle.

* * * * *